US008849217B2

(12) United States Patent
Rousu et al.

(10) Patent No.: US 8,849,217 B2
(45) Date of Patent: Sep. 30, 2014

(54) ANTENNA ARRANGEMENT

(75) Inventors: Seppo Rousu, Oulu (FI); Hannu Palomaa, Kiiminki (FI); Andrew Frankton, Tampere (FI)

(73) Assignee: Broadcom Corporation, Irvine, CA (US)

( * ) Notice: Subject to any disclaimer, the term of this patent is extended or adjusted under 35 U.S.C. 154(b) by 245 days.

(21) Appl. No.: 13/165,884

(22) Filed: Jun. 22, 2011

(65) Prior Publication Data

US 2012/0329407 A1    Dec. 27, 2012

(51) Int. Cl.
| | |
|---|---|
| H04B 7/00 | (2006.01) |
| H01Q 3/26 | (2006.01) |
| H01Q 21/28 | (2006.01) |
| H04B 17/00 | (2006.01) |
| H04B 7/04 | (2006.01) |

(52) U.S. Cl.
CPC ............ *H01Q 21/28* (2013.01); *H01Q 3/2605* (2013.01); *H04B 17/0007* (2013.01); *H04B 7/0417* (2013.01)
USPC ............... 455/69; 455/62; 455/110; 455/446; 455/8; 455/90.2; 455/454; 455/450; 455/509; 455/517; 455/101; 370/335; 370/342; 370/329; 370/337; 370/328

(58) Field of Classification Search
USPC ............ 455/90.2, 88, 83, 454, 450, 455, 464, 455/509, 517, 452.1, 952.2, 120, 126, 101, 455/77, 78, 63.4, 69, 24, 25; 370/335, 342, 370/329, 336, 337, 338, 328
See application file for complete search history.

(56) References Cited

U.S. PATENT DOCUMENTS

| | | | | |
|---|---|---|---|---|
| 5,973,641 | A * | 10/1999 | Smith et al. .................. | 342/372 |
| 6,112,056 | A * | 8/2000 | Langston ........................ | 455/62 |
| 6,473,616 | B1 * | 10/2002 | Sydor ........................... | 455/446 |
| 2004/0095282 | A1 | 5/2004 | Fukushima .................... | 343/702 |
| 2005/0147025 | A1 * | 7/2005 | Auer ............................. | 370/203 |
| 2005/0255805 | A1 * | 11/2005 | Hottinen .......................... | 455/8 |
| 2006/0270352 | A1 * | 11/2006 | Webster et al. ............. | 455/63.4 |
| 2007/0123181 | A1 | 5/2007 | Bit-Babik et al. ........... | 455/101 |
| 2008/0139118 | A1 * | 6/2008 | Sanguinetti ................. | 455/41.2 |
| 2008/0238808 | A1 * | 10/2008 | Arita et al. .................... | 343/893 |
| 2008/0258981 | A1 * | 10/2008 | Achour et al. ................ | 343/702 |
| 2008/0258991 | A1 * | 10/2008 | Montgomery et al. ....... | 343/844 |
| 2012/0281794 | A1 * | 11/2012 | Kent et al. .................... | 375/344 |

FOREIGN PATENT DOCUMENTS

| | | |
|---|---|---|
| EP | 2 178 170 A1 | 4/2010 |
| GB | 2 325 091 A | 11/1998 |
| JP | 2007/243455 | 3/2006 |
| WO | WO 01/71843 A2 | 9/2010 |

* cited by examiner

*Primary Examiner* — Ganiyu A Hanidu
(74) *Attorney, Agent, or Firm* — Stanton IP Law (57) ABSTRACT

There is provided a method, an apparatus and a computer program product, which introduces a phase shift between radiation phase patterns of associated antennas which are applicable in transmitting and/or receiving radio frequency signals simultaneously via an air interface, wherein the phase shift is introduced in order to obtain orthogonality between the associated radio frequency signals.

21 Claims, 4 Drawing Sheets

ANTENNA ARRANGEMENT

FIELD

The invention relates generally to communication systems. More particularly, the invention relates to an antenna arrangement for increasing reception and/or transmission diversity in radio communication system.

BACKGROUND

In telecommunications, a diversity scheme refers to a method for improving the reliability of a communication by using two or more communication channels with different characteristics. Diversity plays an important role in combatting fading and co-channel interference and avoiding error bursts. It is based on the fact that individual channels experience different levels of fading and interference. It is known to use either transmit diversity scheme or a receive diversity scheme. In the transmit diversity, a signal is transmitted via multiple communication channels over air interface, and in the receive diversity, the signal is received via multiple communication channels over the air interface. Therefore, multiple versions of the same signal may be transmitted and/or received and combined in the receiver(s) system(s) having analog and digital functionalities and needed amount of software (SW) algorithms for fulfilling the systems requirements. Diversity techniques may exploit the multipath propagation, resulting in a diversity gain.

In radio communication networks, such as for example in the evolved high speed packet access (HSPA+), in the long term evolution (LTE), in the LTE-Advanced (LTE-A) of the $3^{rd}$ Generation Partnership Project (3GPP), in the code division multiple access (CDMA) and in the time division synchronous CDMA (TD-SCDMA) systems, a multiple-input and multiple-output (MIMO) technique may be used. In the MIMO, multiple antennas at both the transmitter and receiver are employed to improve the communication performance. The MIMO may be applied in generating transmit and/or receive diversity in network elements and terminals. Furthermore, the MIMO may be applied in increasing data/payload throughput of the system (MIMO gain/performance) as the need of retransmissions may be minimized. Further, different signals may be transmitted simultaneously in different data streams. However, in order to obtain increased reliability or throughput, low correlation between the applied MIMO antennas is required. Thus, it is important to provide a solution for efficiently using the diversity schemes with multiple antennas.

BRIEF DESCRIPTION OF THE INVENTION

Embodiments of the invention seek to improve the MIMO/diversity performance when applying multiple antennas.

According to an aspect of the invention, there is provided a method, and an apparatus comprising means, and a computer readable medium carrying a computer program product, for performing any of the embodiments as described in the appended claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Radio communication networks, such as the HSPA+, the Long Term Evolution (LTE), the LTE-Advanced (LTE-A) of the $3^{rd}$ Generation Partnership Project (3GPP), the CDMA, or the TD-SCDMA, are typically composed of at least one base station (also called a base transceiver station, a radio network controller, a Node B, or an evolved Node B, for example), at least one user equipment (UE), such as a mobile user terminal, a palm computer, personal computer/convergence devices, a gaming device, consumer electronics, automotive communication/infotainment connected cars, a smart book, a data card, feature & basic phones, femtocell, relay, router, or any other apparatus capable of operating in a mobile communication network, in a device to device network, in a machine to machine network, and optional network elements that provide the interconnection towards the core network. The UE may also be called a user terminal, terminal device, a modem, or a mobile station, for example. The base station connects the UEs via the so-called radio interface to the network. The base station may provide radio coverage to a cell, control radio resource allocation, handle frequency and bandwidth allocation, handle modulations, determined the number of data streams and/or number of carriers, handle interoperability related functionalities, perform data/payload and control signaling, etc. The cell may be a macrocell, a microcell, femtocell, ad hoc network or any other type of cell where radio connection(s)/coverage is present between devices. Radio communication may be also between device to device (D2D, E2E) or machine to machine, electrical home equipment, etc. Radio communication may happen for different needs, data/payload delivery, supervision information, safety information, entertainment information, services, location, location/navigation services, gaming, transportation services, entertainment services, as some examples.

In general, a base station may be configured to provide communication services according to at least one of the following radio access technologies (RATs): Worldwide Interoperability for Microwave Access (WiMAX), 802.11n, Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA, HSPA+), LTE, CDMA, TD-SCDMA and/or LTE-A, for example. The present embodiments are not, however, limited to these protocols, they may be used in different time division duplexing (TDD) and frequency division duplexing (FDD) systems and combinations of those. In the terminal, a (universal) subscriber identity module(s) (SIM/USIM) may be needed for network connections and services. Each radio access operator may require own SIM/USIM or all radio access may be covered by one. Typically the SIM/USIM is implemented on a SIM/USIM card containing special purpose information and having memory for designated features. In alternative embodiment SIM/USIM may be also implemented to the device, modem, terminal hardware (HW) and/or in a special purpose SW of the terminal. In standardized or ad-hoc systems device may be slave or master according to handshaking. The UE device may be controlled at least by keyboard, touch display, voice, external commands from air interface, external commands from galvanic interfaces, or it may be independent, for example. The UE may be designed to execute commands steps sequentially and/or concurrently.

The base station may be node B (NB) as in the LTE, evolved node B (eNB) as in the LTE-A, a radio network controller (RNC) as in the UMTS, a base station controller (BSC) as in the GSM/GERAN, a relay node, a router node femtocell node, picocell node or any other apparatus capable of controlling radio communication and managing radio resources, interoperability, and interferences within the cell, between adjacent cells and between alternative cells, for example. This may take place also between different communication systems. The base station may also have an effect on mobility management by controlling and analyzing radio signal level-measurements performed, quality of service (QoS), throughput, bit error rate, block error rate, acknowledgement (ACK)/negative ACK (NACK) rated by a user terminal, carrying out its own measurements and performing handovers of user terminals.

Conventional and low cost transceivers may have only a single antenna. On the contrary, devices with multiple antennas may employ diversity reception and/or transmission or MIMO reception and/or transmission, where at least one second antenna is needed for achieving the MIMO/diversity functionality. The MIMO gain refers to increased data/payload throughput, for example. Alternatively, a single-input multiple-output (SIMO) or a multiple-input single-output (MISO) system may be used, depending on whether diversity reception or transmission is to take place. Antenna systems may be built with different combinations: some antennas may have only transmission (Tx) functionality, some may have only reception (Rx) functionality, and some may be employed with both the Tx and the Rx functionalities. That is, the needed Tx and Rx functionalities may be implemented with different antennas or one antenna may perform both functionalities wherein the functionality may be switched in use with special purpose control signals. In Tx functionality, the dedicated Tx antenna may convey signals from a transceiver to the air interface. In Rx functionality, the RX antenna may convey reception signal(s) from the air interface to the transceiver. Terminal may contain several antennas and each antenna functionality may be altered in time domain for improved correlation between antennas, interoperability between communication systems, terminal use case, according running applications, total radiated power (TRP), total isotropic power (TIS), power consumption, data class, active communication systems, running services, user defined performance level.

As said earlier, the MIMO, SIMO or MISO technology may be of use when applying diversity transmission or reception. The MIMO has attracted attention in wireless communications, because it offers significant increases in data throughput and link range with equal additional bandwidth or transmit power. It achieves these by applying a higher spectral efficiency (more bits per second per hertz per bandwidth) or diversity (reduced fading). Because of these properties, MIMO plays an important role in modern wireless communication standards such as in the IEEE 802.11n (WIFI), in the 4G, in the 3GPP LTE, in the worldwide interoperability for microwave access (WiMAX) and in the evolved high speed packet access (HSPA+) and in other evolutions. The HSPA/LTE radio communication frequencies are defined in 3GPP standards. In current standards, the lowest frequency bands start from 700 MHz and the highest frequencies are at 2.6 GHz frequency range Furthermore, different FDD/TDD band allocations are also given an identification number from 1 to 41. However, in future even higher and/or lower frequencies may be used. As an example, 3.5 GHz is under standardization for TDD/FDD systems. Wireless LAN is in use in the industrial, scientific and medical (ISM) band, at 5 GHz and 60 GHz range. Communication systems may use different coding schemes, time domain activity, frequency domain activity, number of carriers, carrier aggregation, modulations, bandwidth, combinations in the transmission/reception activity.

Figures 1, 2A, 2B:
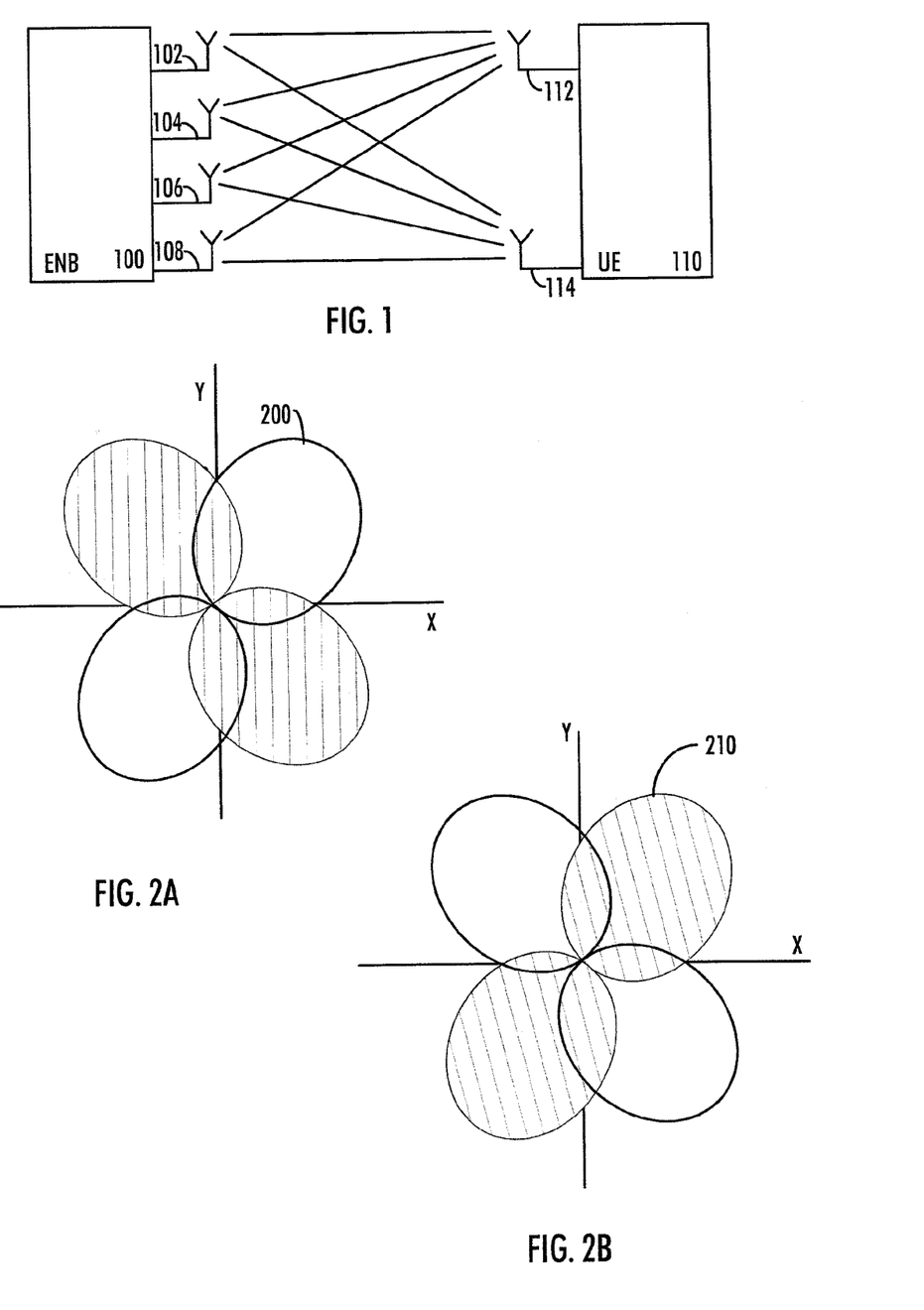
FIG. 1 presents a MMO communication according to an embodiment.
FIGS. 2A and 2B show antenna radiation phase patterns according to some embodiments.

Commercially lowest frequencies are most interesting for network operators, because the lower frequency radio waves are able to travel longer distance than radio waves at higher frequency. FIG. 1 shows an exemplary MIMO communication scheme, where the eNB 100 of the LTE applies four antennas 102 to 108 and the UE 110 is equipped with two antennas 112 to 114. Then communication may take place via multiple communication channels as shown with solid lines between the antennas. The MIMO may thus be related to data transmission to uplink and/or downlink directions.

Single antenna may be operational at one communication system or it may be shared with multiple communication systems at same frequency allocation or multiple communication systems at a designed antenna frequency range. The UE support for communication system frequencies may be done with multiple antennas at different frequency ranges, for example about 1 GHz, about 1.5 GHz, about 2 GHz, about 2.6 GHz, and about 3.5 GHz, as examples of radio communication frequency ranges. In general, the accurate frequencies and channel numbering are detailed in standards. In some embodiments certain frequency ranges may be combined to a same antenna according to antenna system design. In other embodiments all needed frequency ranges may be implemented into the same antenna. Further, the MIMO/diversity functionality transmission/reception, dual active radio operation with single/dual SIM/USIM, carrier aggregation, and other radios may share the antennas available. In an embodiment, a multiple antenna structure may become a single antenna structure having equal special purpose functionalities, characteristics and performance as the multiple antenna structure. Moreover, when antenna radiator frequency is decreased e.g. to 1 GHz and below, also the printed wiring board (PWB) of the terminal device (UE) may be acting as a radiator with the antenna radiator and thus influence the antenna performance parameters and characteristics. Accordingly, the terminal PWB dimensions may be partly defined according to, for example, radiation frequencies and bandwidth needed in terminals. Antenna implementation challenges are related to increasing the number of frequency bands, including lower frequencies of operation, having multiple antennas as required for MIMO and diversity, decreasing antenna volume, distortion products, port-to-port isolation, and imbalance between the antennas, for example. This is because, for example, the UE displays are getting larger, the UE user interfaces cover larger area of the terminal, and the form factors are getting thinner.

The MIMO reception performance may be measured with a data throughput. However, a low signal correlation is needed to capture the full potential of the diversity/MIMO schemes. In order to obtain measurable gain in the data throughput by a radio modem responsible of combining the received signals from the multiple antennas, the signals received by the different reception antennas need to be mutually uncorrelated or close to uncorrelated (i.e. low correlation). In other words, the signals received by different antennas need to be mutually orthogonal. It should be noted here that for the signals to be orthogonal, the signals do not be totally uncorrelated. It is sufficient that the receiver may apply the orthogonality between the signals in order to increase the signal reception reliability. That is, for signal reception, the orthogonality means that the received signals may vary substantially independently of each other during observation time. However, an antenna arrangement that may result in the desired correlation level (orthogonality) is related to the radio frequencies in use.

Further, the antennas may share a common sub-wavelength counterpoise (for example, the PCB and the attached conductor components) so the ability to make the antennas independent may be limited. Additionally, the common counterpoise may limit the isolation between antennas. To facilitate spatial separation and exploit the best locations in the terminal/UE/device, placing the RF front-end sections in more than one area of the handset may be needed. With multiple antennas, some of the antennas may be relegated to less optimal positions where hand effects may be more pronounced. Band-tuning may be used to reduce the physical size of an antenna without reducing the efficiency.

The MIMO reception may apply space diversity due to the spaced antennas according to MIMO. Therefore, the separation between the antennas with respect to the wavelength affects the correlation between the signals received/transmitted at the multiple antennas. From this it is clear that the antenna arrangement difficulty increases when radio communication frequency decreases. Especially for frequencies below 1 GHz in communications, the wavelength is already quite high resulting in problems when implementing the antennas into the UE, especially to portable UEs. A typical consumer handset length is around 100 mm and places for different antennas are limited by the volume of the industrial design. The industrial designs may be discovered with multiple form factors, multiple structures and dimensions. This causes problems in the antenna design as the available space/distances is/are limited. In addition, bandwidth is also highly dependent on the terminal size as small terminal size poses limits when designing antennas. Especially metal cover/metal parts in the design and thin mechanical design impacts antenna height, antenna distance to ground, antenna off-ground clearance and thus increases design challenges and may define achievable antenna performance parameters: bandwidth, frequencies, efficiencies, TRP performance, TIS performance, imbalance between antennas, isolations, distortion, radiation pattern, for example.

To achieve as low cost as possible all or special purpose radio frequency (RF) core functionalities may be integrated to same RF integrated circuit (RFIC). Moreover, to minimize the PWB routing loss between main antenna and RFIC, the RFIC may be arranged to locate as close as possible to main/first antenna. However, it may be desirable to have multiple transmitters/receivers in the same frequency band and to increase the number of frequency bands to include lower frequencies as well. Multiple radio frequency (RF) blocks may be used to facilitate spatial separation and exploit the best locations in a terminal, a laptop, a handset, a UE, tablet device, a modem, etc. This may lead to a situation where PWB routing to other needed antennas (that may locate at the other end of the terminal) may be quite long with an equivalent PWB routing RF loss, which naturally is an unwanted feature to be avoided. These needed routings to secondary antennas may limit possible form factors denoting the mechanical product concept implementations, such as a clam shell, a slide, a communicator. That is, routings, for example traces length, connectors, cables length, isolation, interferences, hinges, volume available for routing to second antenna locations may limit performance in different use-cases, like slide open/closed, clam shell open/closed, monoblock, on cheek, on hand, and/or may limit mechanical concepts for tablets, laptops, monoblocks, etc.

Accordingly, the RF integrated circuit (IC) may be designed to contain needed special purpose functionalities with modem for the radio communication system where it is designed with conventional processing or vector processing. Needed diversity/MIMO functionalities may be implemented on the single special purpose RFIC or the system may be contains multiple RFICs, which are physically equal or different RFICs and those can be controlled independently. From the RFIC point of view, system may be build different combinations/features including the following non-limiting examples: some RFICs may have Tx/Rx functionality, some may have Rx functionality only and some may have Tx functionality only. The needed Tx and Rx functionalities may be thus implemented on same RFIC, or on a different RFICs. A RFIC/combo module may have functionalities and interfaces for multiple communication systems concurrently. Other communication systems may be at least one of the following: Bluetooth, Zigbee, FM, radio data system (RDS), near field communication (NFC), global navigation satellite systems (GNSS), global positioning system (GPS), broadcasting TV transmitters/receivers, WLAN, or any other special purpose communication system. In an embodiment, at least some of the RFIC modem functionalities, processors, controllers, application processors, power management, etc. needed for the special purpose functionalities may be implemented as chips or a single chip. RFICs combinations to antenna systems may vary. In an embodiment, each RFIC may be connected to own antennas or an antenna may be shared with multiple RFICs and antenna connections may be altered according to the use-case, running applications, active radios, sensor information, isolations, interferences, for example. In production of the terminal device or the modem/chipset, for example, there may be multiple combinations designed in order to support the different radio systems, different frequencies, different interoperability use-cases, etc. According to the system design between the antenna and the RFIC, there may be special purpose RF parts in order to meet the radio specification standards, operator requirements and special requirements for products.

It is to be understood that the figure is merely illustrative. The antenna count may vary with different combinations and the UE 110 may have more antennas than the eNB 100. For example, although FIG. 1 shows two antennas 112 and 114 at the terminal device 100, the count of antennas in terminals may be more which may likely increases the terminal costs. Cost effective solution may be achieved when each of the antennas do not need a separate housing (i.e. the count of housings is less than the count of the antennas). The needed dual active, dual HSPA/LTE/LTE-A antenna count is defined by a terminal class and the required minimum performance requirements. According to the terminal class/required performance, the amount of antennas may increase in order to achieve functionalities. Different example carrier aggregation (CA) cases may be, intra band CA, inter band CA, LTE and HSPA+, adjacent CA, non-adjacent CA, reception (Rx) CA, transmission (Tx) CA, etc. For example, the upcoming carrier aggregation may benefit from the use of more antennas, for example. The carrier aggregation (CA) terminal may be active with different frequency combinations such as, for example, LB+LB, HB+HB, LB+HB, HB+2.6 GHz, wherein LB and HB denote low band and high band, respectively. 1.5 GHz radio systems may be count to the LB frequencies or the HB frequencies, as an example of frequency combinations. As said earlier, it is possible that the multiple antenna structure becomes a single antenna structure having equal special purpose functionalities, characteristics and performance as the multiple antenna structure.

Moreover, neighboring antennas in an antenna arrangement may not be independent of each other due to coupling that is present between the antennas. Thus, antenna isolation need to be taken in account in the RF front end design and in the antenna system design for blocking, intermodulation, harmonic power, harmonic intermodulation, adjacent channel leakage ratio (ACLR), wide band noise, component's power handling capability, electrostatic sensitive devices (ESD), interoperability between radios/transceiver, etc. Common conductive connecting means may decrease the coupling, but it may not remove it completely. Further, a common ground (counterpoise) may couple the antenna elements. The coupling decreases as the separation between antenna elements is made larger. Further factors that affect the coupling include antenna type selection, antenna material selection, antenna polarization selection, antenna radiator position, antenna radiation design, ground design, mechanical design, hand effects, material in proximity of antennas, antenna locations versus use case design, for example. The coupling decreases the efficiency of the antenna as part of power is lost to coupling. Coupling may also lead to saturation of the transceiver connected to a neighboring antenna. The small size of the terminal may cause increase in the coupling effect during use cases and also lead to decreased number of form factors. It may also decrease the use of mechanical change of structures and pose use limitations on the antennas.

Correlation between antennas is a measure of the receiving properties of two or more antennas. If correlation is high (i.e. approaching 1), then all antennas have similar properties and receive the same signal. On the contrary, when correlation is low (i.e. approaching 0), then each antenna has totally different receiving properties so they can receive different signals. Thus, low correlation (i.e. orthogonality) between the antennas is important for the MIMO/diversity operation in order to increase the MIMO/diversity reception/transmission performance in the communication and thus increase the communication reliability. The orthogonality may be obtained by separating the antennas from each other by a half of a wavelength, or by a sub-wavelength, for example. To this end, there may be problems relating to the antenna arrangement in a terminal with MIMO/diversity reception/transmission, which needs at least two concurrently active antennas at same time. The correlation factors representing the correlation between the received signals easily tend to be between 0.5 . . . 0.7, especially at frequencies below 1 GHz. However, for MIMO reception the correlation factor needs to be less than 0.5 to enable advantageous measureable reception performance gain for data throughput. Even smaller correlation is desired, for example less than 0.3. Achieving such a small correlation is cumbersome with low frequencies in small terminals, modems, handsets, tablets, laptops, finger computers, etc. Additionally, mechanical changes of a structure and user operation alters antenna characteristic and performance parameters and correlation.

For this reason it is proposed to take the antenna radiation patterns and/or radiation phase patterns into account for MIMO/diversity reception/transmission in order to improve the data throughput yet maintaining good reliability. A radiation pattern is basically a representation of electromagnetic power distribution in free space. The radiation pattern may have a certain phase, which may be represented with a radiation phase pattern. This allows antennas to be located and/or designed more close each other, even in the same end of a terminal or in proximity of each other, thus keeping the number of antenna housings in a terminal device small and costs effective. The possibilities in industrial design are wide, thus the same end of terminal is to be understood without limitations. Moreover, the proximity of each other depends on the wavelength of frequency(s) in use. As an example, an implementation may comprise a rounded design or a sphere, where corners are difficult to define. In an alternative embodiment, the antenna(s) may be located on both sides of a corner or on multiple corners in horizontal/vertical/rotated directions. In an embodiment, it is proposed to apply a first antenna having a radiation phase pattern and at least one second antenna each having a radiation phase pattern for transmitting and/or receiving radio frequency signals simultaneously via the air interface. Thus, multiple antennas or antennas in a single structure are to be applied in the transmission and/or in the reception simultaneously, thus enabling MIMO/diversity to be utilized. Each of the antennas have also a radiation pattern. The number of antennas to be applied is at least two with no upper limit. The antennas may locate as separate antennas and/or the antennas may locate in a single structure, for example. Each antenna may be connected to a radio communication circuitry with a transmission/reception path. The signal paths may eventually be combined in a radio modem for utilizing the MIMO/diversity that is obtainable from using different active antennas. In order to optimally utilize the MIMO/diversity performance gain in the communication system, it is further proposed to introduce a phase shift between the radiation phase patterns of the associated antennas which are applicable in transmitting and/or receiving the radio frequency signals simultaneously via the air interface, wherein the phase shift is introduced in order to obtain orthogonality between the associated radio frequency signals. The introducing of the phase shift may take place in the design phase (for example, in the manufacturing phase) of the antennas or the required phase shift may be obtained by an in-use real-time electrical tuning of the antennas, the antenna circuitries, the RF front end circuitries with special purpose control signals.

In an embodiment, the introduction of the phase shift between the radiation phase patterns of the associated antennas is obtained by performing at least one of the following: opening/closing at least one switch, and designing and/or electrically tuning at least one special purpose radio frequency component, wherein the at least one special purpose radio frequency component is located in at least one of the following: at least one of the associated antennas, at least one of the associated antenna circuitries and the radio front end. An associated antenna circuitry may be the antenna circuitry which corresponds to the associated antenna. The special purpose RF component may be fixed in design. Alternatively it may be a tunable component, such as electrically tunable. It may comprise an array of RF components. The special purpose RF component may be a capacitor, a coil, a duplexer, a filter, a diplexer, a triplexer, an isolator, a power amplifier, for example.

In an embodiment, when a mechanical change of structure (for example, change in the use-case) takes place, a low correlation may be achieved in the new position with product design or with altering/tuning/controls signals. In an embodiment, the structure which position is changed may contain all antennas or antennas may be located in other structures, or combinations.

Although above introduces a phase shift between the radiation phase patterns of the associated antennas in order to optimally utilize the MIMO/diversity performance gain in the communication system, the radiation patterns of the associated antennas may have approximately equal shape, directions, etc. In an alternative or additional embodiment, the radiation patterns of the associated antennas may be rotated, may be made to be directed in different directions, may be made to have deformations in shape, etc. This may be applied to separate antennas and/or antennas in single structure and combinations.

The orthogonality between the radio frequency signals denotes that the received/transmitted signals exhibit low mutual correlation so that a measurable MIMO/diversity performance gain may be obtained. However, total uncorrelation between the signals is neither required nor necessary, as described earlier. The level of correlation in order to reach the orthogonality may depend on the used frequency, for example. For low frequencies, such as below 1 GHz, the required level of correlation may be lower than for high frequencies due to implementation challenges. Further, at certain, relatively low frequency ranges, such as at <1 GHz or at ~2 GHz, low correlation is difficult to achieve in hand held devices, especially when the antennas are at same end of terminal. By applying the appropriate phase shift between associated antennas that causes the orthogonality between the associated signals, measureable diversity performance gain and/or measureable improved throughput of data, payload and/or information is obtained.

RF antennas may not radiate equally in all directions (i.e. they are not isotropic antennas). In fact, any realisable RF antenna design will radiate more in some directions than others. The actual radiation pattern and the antenna bandwidth, for example, are dependent upon the type of antenna design, applied frequency, its size, the environment where the antenna is deployed, the ground distance, the ground clearance, off-ground area and shape, use case, mechanical change of structure, other antennas in proximity, hand effect and a variety of other factors. This directional pattern can be used to ensure that the power radiated is focussed in the desired directions. As frequency affects the pattern design, a so-called front-to-back ratio will fall off rapidly outside a given bandwidth and a carrier frequency, and so will the gain. One way to affect the radiation pattern and/or the radiation phase pattern is to change the electrical length of the antenna which causes a change in the frequency related parameters/characteristic/performance of the antennas, such as in a resonant frequency of the antenna. At the resonant frequency, which generally is the operation frequency of the antenna, only resistive impedance is present. Instead or in addition the radiation pattern may be modified by varying the phase of the radiation patterns of antennas.

Figure 8:
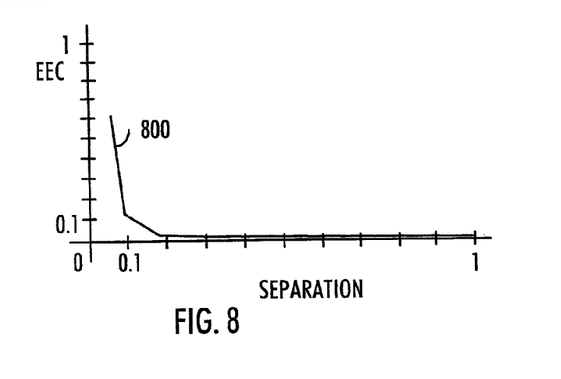
FIG. 8 depicts an envelope correlation coefficient according to an embodiment.

The embodiments enable data streams/paths to be more uncorrelated than if radiation patterns and/or radiation phase patterns were not taken into account. Further, the embodiments allow antennas, antennas in a single structure to be uncorrelated even when they are physically close to each other. This is shown in FIG. 8, where the envelope correlation coefficient (EEC) 800 between the received RF signals is depicted. It can be seen that already with an antenna separation of 0.1 of the wavelength, the achieved envelope correlation coefficient is 0.15, which is reasonable low for achieving a significant gain in reception. This allows the antenna terminals to be in the same end of a mobile phone, for example. This reduces the costs and/or RF routing losses. This is because the antennas may be designed with less antenna housings/modules, which is cost efficient as housings/modules in both ends of a terminal may be avoided. The routing losses to the second antenna(s) may be lower than if the antennas were located in different ends and/or sides of the terminal. This is enabled by having the RF IC and RF front end components locate close to both the main and the diversity (second) antenna(s). Low routing loss is visible to user by improved power levels in transmission and reception and battery life time.

FIG. 2 shows exemplary radiation phase patterns 200 and 210 from two different antenna of the antenna arrangement in the terminal. According to an embodiment, the radiation patterns are designed or tuned/altered such that the radiation patterns in a phase point of view (e.g. a radiation phase pattern) are substantially as shown in FIGS. 2A and 2B for two different antennas. In FIG. 2A, a radiation phase pattern 200 of a first antenna is shown. The beams of the radiation phase pattern 200 shown with vertical lines may represent a first phase deviation of a radiation phase pattern, whereas beams of the radiation phase pattern 200 without vertical lines may represent a second phase deviation. In an example embodiment, the first phase deviation is about 60 degrees and the second phase deviation is around 240 degrees. It can be seen that the radiation phase pattern beams with 240 degrees phase deviation are located in the 'left low part' and 'right high part' of the radiation phase pattern 200 in FIG. 2A for the first antenna. In FIG. 2B, another second antenna may transmit/receive by using a radiation phase pattern 210. For the second antenna, the radiation phase pattern beams with 240 degrees phase deviation are located in the 'left high part' and 'right low part' of the radiation phase pattern 210. Thus, there is about 180 (=240−60) degrees phase shift between the radiation phase patterns 200 and 210 of the two antennas. It is to be noted, even though FIG. 2 depicts a two-dimensional X-Y representation of the antenna phase patterns, it is straight forward to imagine the radiation phase patterns in a three dimensional space co-ordinates.

As the two antennas simultaneously transmit/receive radio frequency signals, the obtained two signals from the two antennas having phase shifted radiation patterns exhibit low mutual correlation. Thus, a measureable MIMO/diversity performance gain may be obtained. As can be seen from FIG. 2, in an embodiment, a phase shift to be introduced between the radiation phase patterns, which phase shift causes orthogonality between the associated radio frequency signals, is substantially 180 degrees. However, a different phase shift than 180 degrees may also be applied as long as the resulting radiation phase patterns differ such that the received/transmitted RF signals are substantially orthogonal and measureable MIMO/diversity performance gain may be obtained. In other words, the phase shift between the antenna radiation phase patterns is applied so that the radiation patterns are not alike in phase point of view.

In order to introduce an appropriate phase shift between the radiation phase patterns, the associated antenna radiators may, in an embodiment, be designed to generate a certain sufficient phase shift between the radiation phase patterns, which certain phase shift causes orthogonality between the associated radio frequency signals. Thus, the associated antennas may, prior to deployment, be designed to have the appropriate phase shift. Such design may comprise design of different components, dimensions, rotations, moves, use-cases, use-case instructions in manual. These may be aided with voice commands, with user interface commands, warning sounds, vibrations, volumes, mechanics and/or materials and selection of parameters/characteristic that are needed in the special purpose antenna arrangement, special purpose antenna circuitries, antenna parasitic elements and/or mechanical concept when structure is changed and which affect the radiation pattern and/or the radiation phase pattern either directly or indirectly. In an embodiment multiple antennas may be designed and tested to be functional when embedded to mechanics, antenna housing elements, printed on PWB, flexible PWB, PWB modules, LTCC modules, for example. The parameters to design may include at least one of the following non-limiting list: electrical length of the antenna element, electrical distance between the antenna elements, electrical distance between the feed points of the antennas, electrical distance between ground connections, electrical distance between the feed point and the edge of the radio front end, such as the PWB edge, shielding, metal or corresponding material in proximity of the antenna, frequency, bandwidth, location of ground, phase of the feed signal (e.g. phase of the feed current), parameters related to impedance matching, etc. Changing any of the above mentioned parameters may affect the radiation pattern and/or the radiation phase pattern of the antenna. The correct parameter values may be obtained by testing and trying or they may be obtained with a mathematical model, for example. Implementation details for different special purpose environments for different embodiments may be explained in product documentation, for example.

Figure 9:
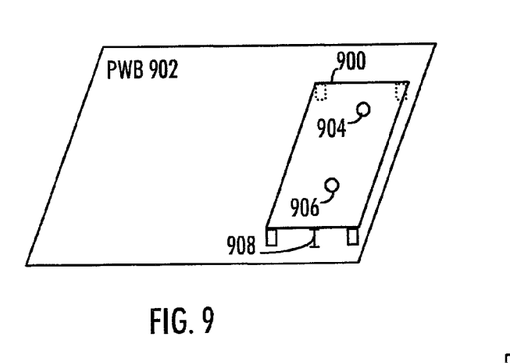
FIG. 9 depict an embodiment with off-ground antennas.

In one exemplary design structure the antenna feed points are located close to each other and off ground-antennas are used where ground material is removed in proximity of antennas. In this embodiment, as shown in FIG. 9, the off-ground area 900 is separated from the PWB 902 area by removal of any metal material in the designed shape in the proximity of antenna. Alternatively antenna may be located in outside of the PWB edge and thus not having metal in proximity of antenna. Antenna may be located with designed height above the level of the PWB. Alternatively, the PWB may have an opening below the antenna. Antenna feeds 904 and 906 may locate on the off-ground area and/or on a ground area, for example. The off-ground area may be lifted from the ground level by distance 908, for example. This embodiment allows for positioning the antenna feeds 904 and 906 at one end of the terminal close to each other, such as 10 mm apart from each other or antennas in a single structure, yet keeping the correlation coefficient small in order to obtain orthogonality between the associated signals. The other end(s) and/or side(s) and/or corners of the terminal need not have antennas for functionality for enabling measurable diversity/MIMO performance gain.

In an alternative embodiment, a terminal may support higher data class (e.g. class 5 is specified for 4 antennas), The needed additional antennas may be located in the other end(s) and/or side(s) and/or corners of the terminal. The terminal or the network may request to alter the data class and, thus, the amount of special purpose antenna count, for example. The terminal/network may send information to network/terminal, respectively, capable to change the terminal class.

In an alternative embodiment, the UE/terminal may inform network about current reception characteristic/performance parameters including the diversity/MIMO correlation. Further, the network may request the terminal to alter/maintain/increase/decrease the correlation in the communication.

In an embodiment, the UE/terminal may store the current reception characteristic/performance parameters including the diversity/MIMO correlation with altering/tuning parameters to terminal memory or to external memory in the network, computer, processor, etc. for further analysis and improvement of diversity/MIMO reception performance. This may happen during a component/module/antenna research, development and life cycle of a product.

The antenna or antennas in a single structure circuitry may be designed so that the required shift between different radiation phase patterns is obtained. The components within the circuitry may include power amplifiers, filters, duplexers, switches, isolators, power splitters, diplexers, phase shifters, couplers, matching components, antenna feed line, and other components, for example. Those may be active/passive, tunable, fixed or any combinations. The parameterization and modification of the above mentioned parameters and component in order to reach a desired phase shifted radiation pattern and/or radiation phase pattern with respect to another radiation pattern and/or radiation phase pattern may be obtained with testing, for example.

The design of the antenna or antennas in single structure may also comprise the selection of a proper antenna type. As known to a skilled person, different antennas have different properties. The selection of an individual antenna may be made from a vast variety of different antenna types comprising a dipole, a monopole, a planar antenna, a horn antenna, a parabolic antenna, an F-type antenna, an isolated mode antenna technology (iMAT), antennas in a single structure, a whip antenna, to only mention a few of antennas well known to a skilled person. Some antennas are on-ground antennas, while others are so called off-ground antennas, where ground metal material is removed from antenna radiator proximity. Antennas may be implemented as wires, for example. However a variety of different antenna implementation techniques exist from different materials.

An antenna circuitry may be seen to feed the radio waves to the rest of the antenna structure in transmit operation, or in receive operation, antennas collect the incoming radio waves, convert them to electric currents and the antenna circuitry convoy them to the receiver. Antennas typically consist of a feed line and additional reflecting or directive structure whose function is to form the radio waves from the feed line into a beam or other desired radiation pattern. The antenna circuitry is usually considered to be all the components between the beam-shaping part of the antenna and the RF front end, including the feed points, the transmission line/path (i.e. a feed line/path or an antenna interface) and components on the transmission line that convoys the signal between the antenna and the transceiver. Antenna typically needs at least one feed having a RF path connection. Additionally antenna may have none, one or more ground connections to which the feed line is at least operatively connected to. The transmission feed line may or may not locate on the printed wiring board of the terminal. Interconnection between antenna radiator and transceivers may be provided with galvanic connection(s) on the PWB, for example, or with coaxial cables, as examples on how signals are convoyed between the radiation element and the RF front end. According to one example, in a laptop having a transceiver part below a keyboard base, the antenna radiators may be located in the base and/or in the proximity of the display structure. The radio frequency signals/control signals may be convoyed by coaxial cables, by flexible PWB, or by any combination of any conveying means, for example, between the functional parts of the special purpose system.

The display may be a conventional display, a touch display, fixed or flexible or something else special purpose industrial design for communication.

Antenna impedance may be designed according to the special purpose design. In an embodiment, the antenna impedances may be substantially equal. In another embodiment, introducing the phase shift between the associated radiation phase patterns takes place by designing or electrically tuning the antenna impedances of the associated antennas to be unequal in order to obtain orthogonality between the associated radio frequency signals. As said, the selection of a high impedance, a low impedance, the equal or unequal impedance may be performed in the design and/or manufacturing of the antenna and/or antenna circuitry or during operation by electrically tuning the impedance with control signals. The impedance of the antenna circuitry is selected according to implementation and antenna types. For example, approximately 50 ohms may be used. The antenna or antennas in a single structure and the antenna circuitry may have tuning possibility and controls may be provided for example with dedicated control interfaces, with radio frequencies over air interface or via galvanic connection(s) to control unit, which generate the needed control signal(s). Controls may be provided with standardized control methods, ad-hoc control methods using various frequencies, modulations and amplitudes, etc.

As said, the embodiments provide for fixed antenna structure where phase shift is introduced when designing the antenna characteristics. However, in an embodiment, the phase shift between the radiation phase patterns of the associated antennas is introduced by electrically tuning the current phase shift between the radiation phase patterns of the associated antennas in order to obtain orthogonality between the associated radio frequency signals. In this way the antenna characteristics of at least one of the associated antennas may be altered. The altering/tuning of the phase of the radiation pattern affects the radiation phase pattern, such as the phase pattern of FIGS. 2A and 2B, for example. Figures are merely examples of radiation phase patterns shapes, wherein the shape may change according to the antenna design and during operation. The altering/tuning may be obtained during use (i.e. practically in real time) by applying control signals from a controller. Embodiments relating to the tuning may contain control circuitry, control signals, feedback signals, information for controlling decisions, flow charts, look up tables to assist appropriate altering/tuning, for example. The electrical altering/tuning is performed to at least one of the following: at least one of the associated antennas, at least one of the associated antenna circuitries, and the radio front end. For example, the tuning may be performed for the circuitry connected to feed signal path, for the circuitry connected to ground connection, for the parasitic load. Tuning control may take account hysteresis, that is, it may apply the history knowledge of earlier tuning and the effects of earlier tuning.

Figure 3:
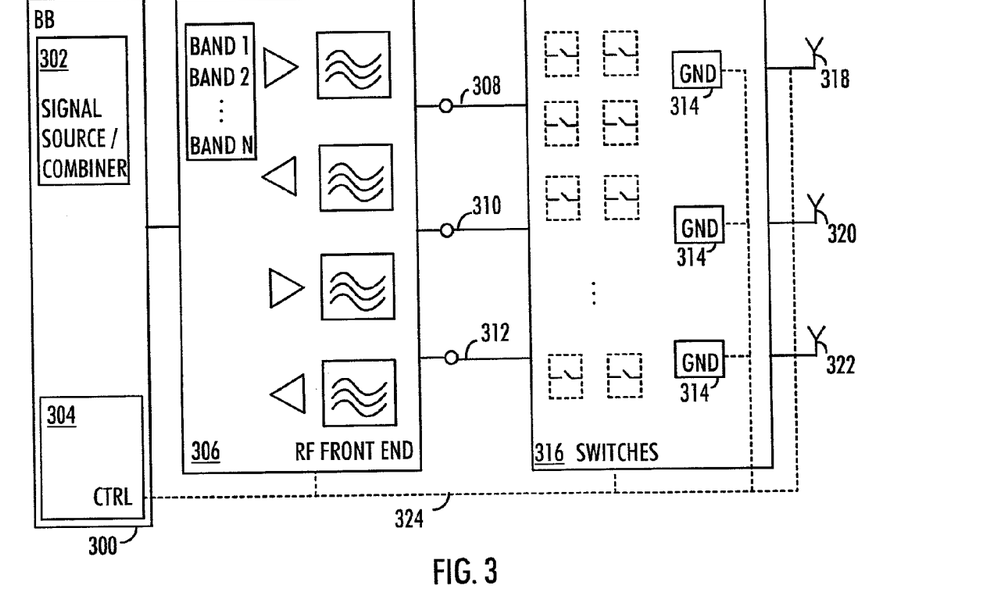
FIGS. 3 and 4 show block diagrams for fixing and/or tuning the antenna characteristics according to some embodiments.

The block diagram of FIG. 3 shows a base band (BB) block 300 comprising a signal source 302 (in case of transmission) or a signal combiner 302 (in case of a receiver). The block 302 may be considered to represent the radio modem of the terminal. Block 300 may contain numerous other blocks as display, touch display, $2^{nd}$ display, flexible display, flexible user interface, earpiece, microphone, keypad, battery, connectors, proximity sensors, regulators, controllers, application processors, other special purpose radios according product. From the BB block 300, the signal is directed to the RF front end-block 306, which comprises components such as frequency converters, power amplifiers, filters, duplexers, switches, isolators, power splitters, diplexers, phase shifters, couplers, detectors, antenna tuners, frequency band selectors, matching components and other components which may be needed in a special purpose RF system. These parts may be discrete, integrated circuits or modules with passive, actively tunable, or fixed characteristics. Components may be fixed and/or tunable with controls. Furthermore, components may be active and/or passive and those may be designed as modules. In the case of transmission, after the radio front end-block 306 are the interfaces 308 to 312, such as antenna feed lines. Naturally, there may be more or less than three interfaces, which is merely an example in FIG. 3. The interface 308, for example, may be considered to be comprised in the antenna circuitry comprising all the components (including the associated components from a switch block 316) and conductive transmission line between the RF front end-block 306 and the antenna 318. Further, the antenna circuitries may or may not be connected to a ground 314. The switch block 316 may comprise switches that may be opened or closed with control signals 324 from the controller 304.

Antennas 318 to 322 may be located in same mechanical structure or at least some of them may be located in different mechanical structures. Furthermore, two or antennas may be designed to a module, which can be implemented in the design. Antennas in the module may be tested so that they are designed to have tested/specified minimum correlation, e.g. EEC. One or more antennas in the module may be designed for interoperability. Isolation between antennas may have tested/specified minimum value. Antenna functionality in the module may be altered according active radios interoperability.

The controller 304 may be used to tune the antennas 318 and 322 with the control signals 324. The tuning of the antennas may comprise tuning of bandwidth, resonance, efficiency, gain, directivity, beam forming parameters, radiation, radiation phase parameters. A single antenna may have a single or multiple resonance frequencies, each of which may be tunable. The tuning may comprise changing the electrical length of the antenna or the special purpose antenna circuitry, for example. For this purpose, the antenna elements 318 to 322 or the antenna circuitries may be equipped with switches that may be opened/closed in order to change at least one of the electrical length of the antenna structure, electrical length of the ground connection, termination of ground connection, parasitics of the antenna, the phase of antenna feed and/or the ground feed, etc. In some embodiments, the antenna elements or the antenna circuitries may be equipped with capacitors, coils, phase shifters, splitters, isolators and other special purpose RF components which may be fixed or tunable with special purpose controls. The controls may come from a special purpose processor which generates controlling steps according to special purpose control sequence, for example. The change in the antenna circuitry may affect the resonance frequency(ies) of the antenna, for example. The change in the antenna circuitry affects the phase of the feed signal and, therefore, the phase of the radiation pattern (e.g., the radiation phase pattern) of the associated antenna. This allows for more efficient use of diversity. This is because the tuning of the antenna may be used to obtain the required phase shift between the antenna radiation phase patterns of the associated antennas.

In an embodiment, galvanic characteristics between at least two of the associated antennas are altered/changed in order to control the phase shift, wherein the galvanic characteristics comprise at least one of the following: a distance, a phase of a signal and impedance of a related antenna circuitry.

By tuning it is meant that the characteristics may be altered/varied/changed. The signal may be any signal that is conveys between the antennas, for example, the antenna feed signal. The related antenna circuitry may be the circuitry that is related to the any of the at least two antennas. The changing of the characteristics may be obtained by performing at least one of the following: opening/closing at least one switch, and designing and/or tuning at least one special purpose radio frequency component, wherein the at least one special purpose radio frequency component is located in at least one of the following: at least one of the associated antennas, at least one of the associated antenna circuitries and the radio front end.

Looking at FIG. 3, the switch block 316 comprises at least one switch that may be opened or closed by the control signal(s) 324 from the controller 304. The switches may be used to control the characteristics, such as the length, phase and impedance, of the feed transmission lines of the two associated antennas such that coupling effect between the antennas is altered. In an embodiment, the altering of characteristics may be done by at least one of the following: a switch selection, a low impedance selection, a high impedance selection, a phase shift selection, for example. For example, the electronic distance between associated antennas may be altered. The switches and special purpose components in alternative interfaces may be used to alter the transmission feed line characteristics so that the electrical distance between the antenna 318 to 322 and the radio front end-block 306 is altered, thus affecting the phase of the feed signal and consequently the phase of the radiation pattern. The switches of the switch block 316 may further be used to alter the galvanic connection between the antennas when such galvanic connection exists via a conduct line. In an embodiment, galvanic characteristics between at least one of the associated antenna interfaces 308 to 312 and the ground 314 are changed in order to control the phase shift, wherein the galvanic characteristics comprise at least one of the following: a distance, a phase of a signal and an impedance of a related antenna circuitry. The signal may be any signal that is conveyed between ground and the associated antenna, for example, the antenna ground feed signal. The related antenna circuitry may the circuitry that is related to the any of the at least one associated antenna. The changing of the characteristics may be obtained by performing at least one of the following: opening/closing at least one switch, and designing and/or tuning at least one special purpose radio frequency component, wherein the at least one special purpose radio frequency component is located in at least one of the following: at least one of the associated antennas, at least one of the associated antenna circuitries and the radio front end.

Figure 4:
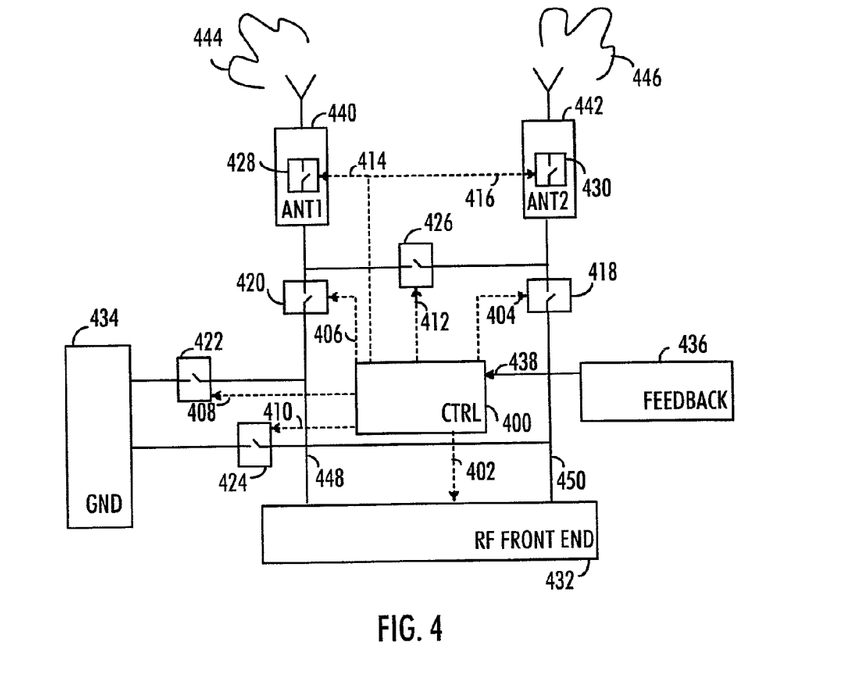

Let us take a closer look of the controlling of the characteristics, such as distances and electrical lengths in the antenna arrangement by using the switches. FIG. 4 shows a controller or a control circuitry 400 which may provide control signals 402 to 416 to components such as to switches 418 to 430 and to a RF front end 432 including the possibly tunable amplifiers, adaptive antenna matching unit, filters, duplexers, diplexers, phase shifters, adaptive filter matching, tunable filters, tunable duplexers, tunable diplexers, band selectors, for example. The transmission feed lines 448 and 450, also called the interfaces, to antennas 440 and 442, respectively, may or may not be connected to a ground 434. To this end it should be noted that any change in the antennas or in the electrical antenna circuitry (feed point, feed path, ground connection, etc.), affects the phase relation between the antenna radiation patterns. It should also be noted that each of the switch blocks 418 to 430 may comprise a single switch or a plurality of switches.

The control signal 402 is aimed to the RF front end for tuning the components within the RF front end. These components may need tuning according to transmission/reception frequencies, transmission/reception activity, modulation, bandwidth, different transmit power, reception power, diversity/MIMO operation, carrier aggregation operation, when the use-case situation alters, interoperability, when the mechanical structure changes, for example. Control circuit 400 may be located in the RF front end, in the RFIC, in a power management unit, in any special purpose controller, in the BB block, in the special purpose application processors. FIG. 4 shows only a simplified figure for clarity.

The special purpose control signals 404 and 406 may be used to electrically open/close the switches 418 and 420, respectively. Let us assume that the switch block 418 comprises two parallel switches, a first and a second switch. When the control signal 404 opens the first switch and closes the second switch, the electric current to the antenna 442 runs via the closed second switch. The electrical length, phase, and/or impedance of the route via the second switch may be different than via the first switch. Thus, the electrical impedance, phase and/or length of the feed line (a.k.a. the interface) may be altered. As the coupling connects the two antennas together and the coupling takes place between the circuitries of the antennas, the electrical characteristics, such as the distance, phase and/or impedance between the two antennas and the coupling may be controlled by the use of the switches in the feed line.

Even though it is shown that some of the switches are located in the antenna feed paths 448 and 450, they or some of them may instead be located elsewhere in the antenna circuitry or be connected to the antenna circuitry in order to tune the antennas and/or the antenna circuitries. In an embodiment, at least some of the switches may be located in the PWB of the terminal device, antenna housings, mechanical housings, as examples.

As said, the transmission feed line 450 may this way be electrically adjustable which affects the phase of the feed signal to the antenna 430 and therefore alters the phase of the radiation pattern 446.

In an embodiment, the feed signal phase may be designed/altered/tuned in a modem in order achieve the desired phase in the feed signals which affects the phase of the feed signal to the antenna and therefore alters the phase of the radiation pattern. The same may be done in the network side. Different delays and/or phases of different frequency signals may be measured in the design phase and stored to memory or processing code to be used in order to achieve MIMO diversity performance gain in the design or during use by tuning/altering. The terminal and the network may communicate between each other the special purpose parameters/characteristics prior and/or after the change of parameters/characteristics. The same may be done in conjunction with beamforming. Therefore, by applying appropriate phases of the feed signals, a beam directed to desired direction may be formed. The appropriate phases may be obtained by testing or by applying mathematical modeling, for example.

The control signals 408 and 410 are for electrically tuning the galvanic characteristics, such as the distance, the phase and/or the impedance, between the interface and the ground, when such ground connection exists, by opening/closing switches 422 and 424, respectively. The connection line between the feed line 448 and the ground 434 may be equipped with parallel pair of switches 422, for example.

Figure 10:
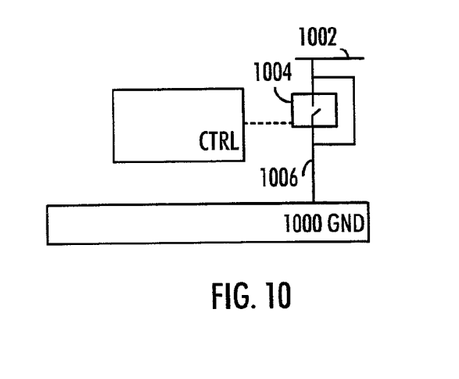
FIG. 10 illustrates tuning of the ground signal connection according to an embodiment.

When a first switch is open and a second switch is closed, the distance between the ground 434 and the feed 448 is different from the distance when the first switch is closed and the second switch is open. This way the distance to the ground 434 may be varied. Alternatively or in addition, a switch may be applied in selecting between a high impedance state, and a low impedance state, or to introduce different phase shifts between the radiation phase patterns. Varying the characteristics, such as distance, impedance and/or phase, affects the phase of the radiation pattern due to changed phase of the signal. In another embodiment, as shown in FIG. 10, the ground feed 1006 from the ground 1000 to the antenna feed path 1002 forms a U-shape. The distance may then be altered with a switch 1004 which have the effect that closing the switch 1004 shortens the ground feed line 1006 as electricity may flow without the U-shape. The opening/closing of the switch 1004 may be controlled with electrical control signals from the controller (CTRL). In alternative embodiment, the U-shape may have multiple switches for the distance adjustment.

The control signal 412 is for electrically tuning the galvanic connection between the antennas by opening closing the switch 426. Again the switch 426 may comprise a plurality of switch elements. When the connection between the antenna elements is closed (i.e. connection exists via a conduct line, not merely coupling), the coupling may be decreased as the electric current may flow via the conduct line where the switch 426 is located. By having parallel switches in the switch block 426, the electrical distance and the electrical connection, special purpose impedances between the antennas may be tuned, which affects the phase of the feed signal and the phase of the radiation pattern.

It should be noted that the switch and the switch blocks in the Figures may also represent special purpose RF components or special purpose RF functionalities which may be designed or tuned to alter the impedances, phase, lengths, and distances between two elements, for example. This affects the phase of the feed signal and the phase of the radiation pattern (the phase radiation pattern). The special RF components may comprise tunable coils, tunable capacitors, tunable filters, tunable duplexers, tunable diplexers, etc.

The control signals 414 and 416 may be used to electrically tune the antennas 440 and 442 with respective switches 428 and 430. As earlier said the electrical length of the antenna may be made longer or shorted by using the switches. Similarly, the impedance may be changed. This affects the antenna characteristics, including the frequency related parameters and, in particular, the phase of the radiation pattern. As a result, the radiation patterns 444 and 446 of the antennas 440 and 442 may be tuned/altered by appropriately changing the phase shift between the radiation phase patterns. The patterns 444 and 446 may be made to have, for example, 180 degrees phase shift between a first and a second antenna which allows measureable improvement in diversity/MIMO performance in the associated transmitted/received RF signals. Also, this may be of use when interference is present at some frequency and this frequency is to be avoided (i.e. shift away from interference frequency range). Alternatively or in addition to, isolation between interfering and victim antennas may be increased by altering radiation pattern and/or the radiation phase pattern.

In an embodiment, the controller 400 obtains feedback 438 related to performed radio communication. Based on the feedback 438, the controller 400 may perform the electrical altering/tuning of the phase shift between the radiation phase patterns of the associated antennas. Thus, when the controller 400 obtains information that diversity/MIMO performance gain is not as desired, the controller 400 may decide to tune/alter the phase shift of the radiation phase patterns of the associated antennas. When this type of closed loop tuning is performed, the feedback may be obtained from at least one of the following: the RF block 432, the BB 300 of FIG. 3, a radio modem, special purpose controller, a power management IC, a dedicated feedback circuitry 436, an application processor, for example. The feedback information may be originated from detectors, proximity sensors, circuitries having connection to the RF transmission/reception paths, information may be extracted from communication parameters, processed from reception/transmission signal parameters. The feedback related to the radio communication may comprise information about the applied use-case, the mechanical structural of the device, interoperability, etc. Interoperability feedback/information may contain for example information about an interference source system, interference source systems, and/or interference victim systems. Further feedback information may be, for example, radio frequencies, transmission power(s), reception power(s), ACLR power(s), wideband noise level(s), in-band spurious level(s)/frequency(s), out-of-band spurious levels/frequencies, harmonics frequencies and power levels, intermodulation results and power levels, blocking frequencies and power levels. The network parameters and downlink/uplink quality parameters may be utilized and quality parameters may be calculated in the radio modem for controlling purposes. The calculated output may contain information about which antenna radiator parameters need to be tuned/altered and/or which antennas need to be replaced by a third antenna radiator in order to achieve a measureable diversity/MIMO performance improvement. The feedback may be for example data throughput, reception quality indicator, ACK and NAK relation, network feedback signal, correlation calculated from by the radio modem, etc. The feedback may be analog or digitally controlled by a standard control system or the control system may be chipset specific. However, instead of closed loop tuning, an open loop tuning may be performed without feedback signals.

In an embodiment, the tuning is performed on the basis of at least one of the following: transmission/reception frequency, transmission/reception activity, transmission/reception bandwidth, number of carriers, modulation, diversity/MIMO operation, and carrier aggregation operation. That is, when change in the radio communication related parameters is needed, the tuning of the antenna 440 and 442 or the radio front end-block 434 may be triggered, for example. The tuning of the radio communication related parameters may then be followed by or combined with tuning/altering the radiation patterns and/or the radiation phase patterns in any of the means as provided by the embodiments or combinations of the embodiments.

In an embodiment, at least one of the associated antennas is replaced with another antenna on the basis of at least one of the following: transmission/reception activity, mechanical change in the structure of a terminal device comprising the antennas, interference level, transmission/reception power level(s), transmission bandwidths, modulation, interoperability between different radio functionalities and change in carrier aggregation configuration. The replacement may also be based on a change in the diversity/MIMO radio parameters. The replacing may be part of tuning process. The replacement may be obtained with switches by opening a switch to the currently associated antenna and conveying the feed signal to another antenna by closing the switch or switches that correspond to that antenna. The transmission/reception activity may comprise switching between Tx and Rx antennas when transmission and reception are to take place in adjacent turns.

Further criteria for replacing an antenna may include whether or not multiple radios are active concurrently, interoperability between the radios, etc. When interference is present at one antenna, the antenna may be replaced with another. When received power is high, an antenna connected to components of low power tolerance may be replaced with another antenna connected to components of higher tolerance or with antennas having higher isolation. Alternatively, the radiation pattern of an antenna with low power tolerance may be tuned so that less power is received. When bandwidth is changed, the antenna may need to be changed as well to better cope with the required bandwidth/frequency/carrier aggregation requirements. The change of the antenna also affects the electrical distance between the feed points of the associated antennas.

The mechanical change in the structure of a terminal device may comprise, for example, slide open/closed, hinge open/closed, clam shell open/closed. Thus, the apparatus comprising the antenna arrangement may comprise detectors and/or sensors for detecting such changes in the mechanical structure of the terminal device. When such change is detected, the controller 400 may decide to replace an antenna with another antenna which is located in a more optimal position with respect to the MIMO/diversity reception performance gain. Further criteria for replacing an antenna with another may comprise the position of the terminal device. The sensors and detectors may also be responsible of determining the position and placement of the terminal device. Such positions may comprise cheek, hand, table, above knees, for example. When an antenna is located against a table, for example, it may be advisable to replace that antenna with another. Therefore, special purposes steps and/or functionalities may be executed by a controller in order to achieve a measureable diversity/MIMO performance improvement.

Figure 5:
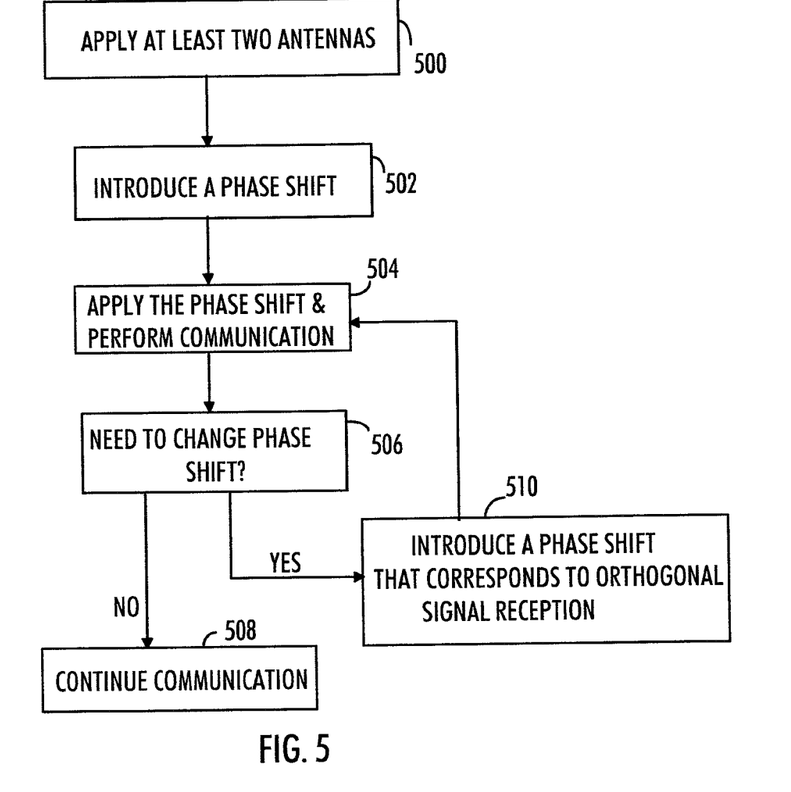
FIGS. 5 and 6 illustrate methods according to some embodiments.

FIG. 5 shows a flow diagram for introducing the phase shift between the radiation patterns and electrically altering/tuning the radiation patterns and/or the radiation phase pattern when needed. In step 500, at least two antennas are simultaneously applied, thus corresponding to a multiple antenna transmission/reception. In step 502, a phase shift is introduced by designing the antennas in an appropriate manner as described above or by tuning the antennas during use. Consequently, data communication may be performed by applying the introduced phase shift in step 504. Next, in step 506, it is determined whether or not a change in the phase shift is needed. The need to change may be obtained on the basis of the feedback or as part of reconfiguring the system. If the answer is negative, then communication may be continued at step 508. However, if the answer is positive, then step 510 may be followed wherein another phase shift is introduced by tuning the characteristics of the antenna, the antenna circuitry, the radio front ends, or by replacing the antennas in use with another antenna, for example. In any case, a new phase shift that corresponds to orthogonal signal transmission/reception in the prevailing situation is obtained. The tuning at this step may be any of the tuning methods described above such as altering the galvanic distance between antennas, altering the galvanic connection between the antennas, altering the impedance and/or phase of the antenna feed path and altering the galvanic distance between the antenna feed points and the ground plane, for example. After the newly introduced phase shift is obtained, the communication may be started/continued with the new phase shift in step 504.

Figure 6:
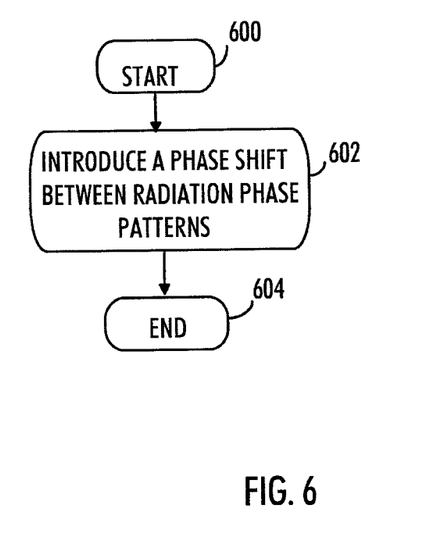

FIG. 6 illustrates a method for increasing diversity in multi-antenna communication. The method starts in step 600. In step 602, the method comprises introducing a phase shift between radiation phase patterns of associated antennas which are applicable in transmitting and/or receiving radio frequency signals simultaneously via an air interface, wherein the phase shift is introduced in order to obtain orthogonality between the associated radio frequency signals. The method ends in step 604.

Figure 7:
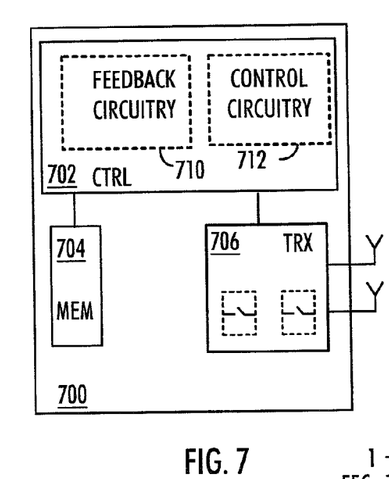
FIG. 7 presents an apparatus according to an embodiment.

In an embodiment, as shown in FIG. 7, an apparatus 700 may comprise at least one processor 702 and at least one memory 704 including a computer program code, wherein the at least one memory 704 and the computer program code are configured, with the at least one processor 702, to cause the apparatus 700 to carry out any one of the above-described processes relating to the tuning/altering of the antenna, the antenna circuitry, the radio front end circuitry, for example. It should be noted that FIG. 7 shows only the elements and functional entities required for understanding the apparatus 700. Other components have been omitted for reasons of simplicity. The implementation of the elements and functional entities may vary from that shown in FIG. 7. The connections shown in FIG. 7 are logical connections, and the actual physical connections may be different. The connections can be direct or indirect and there can merely be a functional relationship between components. It is apparent to a person skilled in the art that the apparatus may also comprise other special purpose functions and special purpose structures. The apparatus 700 may be implemented as a unit or module and have analog, digital, power, antenna interfaces, for example.

The apparatus 700 may comprise the terminal device of a cellular communication system, e.g. a computer (PC), a laptop, a tabloid computer, a cellular phone, a communicator, a smart phone, a communication unit, a smart book, a palm computer, or any other communication apparatus. In another embodiment, the apparatus is comprised in such a terminal device, e.g. the apparatus may comprise a circuitry, e.g. a chip, a processor, a micro controller, or a combination of such circuitries in the terminal device and cause the terminal device to carry out the above-described functionalities. Apparatus may be part of chipset. Further, the apparatus 700 may be or comprise a module (to be attached to the UE) providing connectivity, such as a plug-in unit, an "USB dongle", or any other kind of unit. The unit may be installed either inside the UE or attached to the UE with a connector or even wirelessly.

As said, the apparatus 700 may comprise the at least one processor 702. The at least one processor 702 may be implemented with a separate digital signal processor provided with suitable software embedded on a computer readable medium, or with a separate logic circuit, such as an application specific integrated circuit (ASIC). The at least one processor 702 may comprise an special purpose interface(s), such as a computer port, for providing communication capabilities.

The at least one processor 702 may comprise a special purpose control circuitry 712 The control circuitry 712 may be responsible from performing the tuning based on the control signal provided by the control circuit 712. The at least one processor 702 may also comprise a feedback circuitry 710 for providing feedback to the controller circuitry 712, as described above. The feedback circuitry 710 may determine the correlation (EEC) values from received information and this way inform the control circuitry of possibly needed tuning/altering.

The apparatus 700 may further comprise radio interface components 706 (TRX) providing the apparatus with radio communication capabilities with the radio access network. The radio interface components 706 may comprise standard well-known components such as amplifier, filter, frequency-switches, other special purpose RF components, converter, (de)modulator, and encoder/decoder circuitries and one or more antennas. The TRX 706 may comprise a plurality of switches, a capacitor bank, a coil bank, capacitors, coils, etc. that are used in tuning the phase shifts of the antenna radiation patterns and/or the radiation phase patterns according to any of the embodiments.

As said, the apparatus 700 may comprise a memory 704 connected to the processor 702. However, memory may also be integrated to the processor 702 and, thus, no memory 704 may be required. The memory may be for storing data related to tuning functions, such as look-up tables, feedback information, etc. In an embodiment, parameters that may be tuned and the appropriate values of the parameters may be obtained in production and stored to memory for further use. That is, in use, the memory may be used to retrieve correct values for certain parameters that need to be tuned. For example, with certain frequency certain electrical characteristics of the antenna circuitry may be needed. The certain electrical characteristics may be stored in memory and by knowing the characteristics, correct switches or correct amount of switches may be opened or closed or capacitors/coils/phase shifters may be tuned, thus obtaining suitable length, distance, phase or impedance, for example.

In an embodiment, at least one configuration comprising tuning instruction for at least one of the following: at least one of the associated antennas, at least one of the associated antenna circuitries and the radio front end is stored in the memory, wherein each configuration produces a certain phase shift. Consequently, the network element performing the tuning, may then apply an appropriate configuration from the memory when the certain phase shift is to be obtained between the radiation phase patterns of the associated antennas. This has the advantage that computational resources may not need to be applied in that point for calculating the configuration. There may be a plurality of configurations. The parameter values for the RF components, the switches to be opened/closed, etc. may be obtained through testing in the design phase, or via mathematical modeling, for example.

In an embodiment, different design structures are stored and the apparatus may be caused to select one of the stored design structures. The different design structures may be obtained when the associated antenna radiators, the radio front end and/or the associated antenna circuitries are designed to generate a certain phase shift between the radiation phase patterns. Thereafter, the selected design structure may be used in the antenna arrangement.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

As said, the apparatus 700 may also be or be comprised in a module which can be attached to the apparatus whose antenna patterns may need to be controlled. The module may naturally contain also other components than antenna and those may comprise proximity sensors, antenna matching components, adaptive antenna matching, etc. The module may be simply attached to the PWB of the terminal device, for example.

The invention provides several advantages. For example, data throughput/speed may be increased with measureable amount. Moreover, the antenna locations impact the terminal's form factor, allow dimensions to be decreased and thus different kind of terminal structures and use cases. The embodiments improve the network capacity because it reduces the fail rate in data package reception and may thus allow use of higher data classes.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by special purpose processors. The special purpose memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configure to carry out embodiments of any of the FIGS. 1 to 10. In an embodiment, the at least one processor 702, the memory 704, and the computer program code form an embodiment of processing means for carrying out the embodiments of the invention.

In an embodiment, the apparatus comprises processing means configured to perform the tasks of FIGS. 1 to 10.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer, a processor, or a special purpose device able to execute commands. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
providing a wireless communication apparatus comprising associated antennas, wherein the associated antennas comprise at least two antennas having radiation phase patterns, wherein a radiation phase pattern of an antenna is a representation in free space of electromagnetic power distribution having a certain phase; and
introducing a phase shift between the radiation phase patterns of the associated antennas which are applicable in transmitting and/or receiving associated radio frequency signals simultaneously via an air interface of the wireless communication apparatus, wherein the phase shift is introduced by electrically tuning the current phase shift between the radiation phase patterns of the associated antennas in order to obtain orthogonality between the associated radio frequency signals as transmitted in an uplink or downlink direction, wherein the phase shifted radiation phase patterns of the associated antennas are such that at least two of the associated antennas have different radiation phase patterns, wherein electrically tuning the phase shift between the radiation phase patterns of the associated antennas is on the basis of obtained feedback related to performed radio communication.

2. The method of claim 1, further comprising: introducing the phase shift by designing associated antenna radiators, a radio front end and/or associated antenna circuitries to generate a certain phase shift between the radiation phase patterns, which certain phase shift causes orthogonality between the associated radio frequency signals.

3. The method of claim 1, wherein the electrical tuning is performed to at least one of the following: at least one of the associated antennas, at least one of associated antenna circuitries and a radio front end.

4. The method of claim 1, further comprising: changing galvanic characteristics between at least two of the associated antennas, wherein the galvanic characteristics comprise at least one of the following: a distance, a phase of a signal and an impedance of a related antenna circuitry.

5. The method of claim 1, further comprising: changing galvanic characteristics between at least one of the associated antenna interfaces and a ground in order to control the phase shift, wherein the galvanic characteristics comprise at least one of the following: a distance, a phase of a signal and an impedance of a related antenna circuitry.

6. The method of claim 1, further comprising: introducing the phase shift by designing or electrically tuning antenna impedances of the associated antennas to be unequal in order to obtain orthogonality between the associated radio frequency signals.

7. The method of claim 1, wherein the introduction of the phase shift between the radiation phase patterns of the associated antennas is obtained by performing at least one of the following: opening/closing at least one switch, and designing and/or electrically tuning at least one special purpose radio frequency component, wherein the at least one special purpose radio frequency component is located in at least one of the following: at least one of the associated antennas, at least one of the associated antenna circuitries and the radio front end.

8. The method of claim 1, wherein the phase shift, which causes orthogonality between the associated radio frequency signals, is substantially 180 degrees.

9. The method of claim 1, further comprising: replacing at least one of the associated antennas with another antenna on the basis of at least one of the following:
transmission/reception activity, mechanical change in the structure of a terminal device comprising the antennas, interference level, transmission/reception power level, transmission bandwidths, modulation, interoperability between different radio functionalities, and change in carrier aggregation configuration.

10. The method of claim 1, further comprising: storing to a memory at least one configuration comprising tuning instruction for at least one of the following: at least one of the associated antennas, at least one of the associated antenna circuitries and the radio front end, wherein each configuration produces a certain phase shift; and applying an appropriate configuration from the memory when the certain phase shift is to be obtained between the radiation phase patterns of the associated antennas.

11. An apparatus, comprising:
associated antennas comprised of at least two antennas having radiation phase patterns, wherein a radiation phase pattern of an antenna is a representation in free space of electromagnetic power distribution having a certain phase;
at least one processor; and
at least one memory including a computer program code, wherein the at least one memory and the computer program code are configured to, with the at least one processor, cause the apparatus at least to:
introduce a phase shift between the radiation phase patterns of the associated antennas which are applicable in transmitting and/or receiving radio frequency signals simultaneously via an air interface of the apparatus, wherein the phase shift is introduced by electrically tuning the current phase shift between the radiation phase patterns of the associated antennas in order to obtain orthogonality between the associated radio frequency signals as transmitted in an uplink or downlink direction, wherein the phase shifted radiation phase patterns of the associated antennas are such that at least two of the associated antennas have different radiation phase patterns, wherein electrically tuning the phase shift between the radiation phase patterns of the associated antennas is on the basis of obtained feedback related to performed radio communication.

12. The apparatus of claim 11, wherein the apparatus is further caused to: introduce the phase shift by designing associated antenna radiators, a radio front end and/or associated antenna circuitries to generate a certain phase shift between the radiation phase patterns, which certain phase shift causes orthogonality between the associated radio frequency signals.

13. The apparatus of claim 11, wherein the electrical tuning is performed to at least one of the following: at least one of the associated antennas, at least one of associated antenna circuitries and a radio front end.

14. The apparatus of claim 11, wherein the apparatus is further caused to: change galvanic characteristics between at least two of the associated antennas, wherein the galvanic characteristics comprise at least one of the following: a distance, a phase of a signal and an impedance of a related antenna circuitry.

15. The apparatus of claim 11, wherein the apparatus is further caused to: change galvanic characteristics between at least one of the associated antenna interfaces and a ground in order to control the phase shift, wherein the galvanic characteristics comprise at least one of the following: a distance, a phase of a signal and an impedance of a related antenna circuitry.

16. The apparatus of claim 11, wherein the apparatus is further caused to: introduce the phase shift by designing or electrically tuning antenna impedances of the associated antennas to be unequal in order to obtain orthogonality between the associated radio frequency signals.

17. The apparatus of claim 11, wherein the introduction of the phase shift between the radiation phase patterns of the associated antennas is obtained by performing at least one of the following: opening/closing at least one switch, and designing and/or electrically tuning at least one special purpose radio frequency component, wherein the at least one special purpose radio frequency component is located in at least one of the following: at least one of the associated antennas, at least one of the associated antenna circuitries and the radio front end.

18. The apparatus of claim 11, wherein the phase shift, which causes orthogonality between the associated radio frequency signals, is substantially 180 degrees.

19. The apparatus of claim 11, wherein the apparatus is further caused to: replace at least one of the associated antennas with another antenna on the basis of at least one of the following: transmission/reception activity, mechanical change in the structure of a terminal device comprising the antennas, interference level, transmission/reception power level, transmission bandwidths, modulation, interoperability between different radio functionalities, and change in carrier aggregation configuration.

20. The apparatus of claim 11, wherein the apparatus is further caused to: store to a memory at least one configuration comprising tuning instruction for at least one of the following:

at least one of the associated antennas, at least one of the associated antenna circuitries and the radio front end, wherein each configuration produces a certain phase shift; and apply an appropriate configuration from the memory when the certain phase shift is to be obtained between the radiation phase patterns of the associated antennas.

21. A non-transitory computer-readable medium comprising program instructions which, when loaded into an apparatus, execute operations, wherein the apparatus comprises associated antennas, wherein the associated antennas comprise at least two antennas having radiation phase patterns, wherein a radiation phase pattern of an antenna is a representation in free space of electromagnetic power distribution having a certain phase, the operations comprising:

introducing a phase shift between the radiation phase patterns of the associated antennas which are applicable in transmitting and/or receiving associated radio frequency signals simultaneously via an air interface of the apparatus, wherein the phase shift is introduced by electrically tuning the current phase shift between the radiation phase patterns of the associated antennas in order to obtain orthogonality between the associated radio frequency signals as transmitted in an uplink or downlink direction, wherein the phase shifted radiation phase patterns of the associated antennas are such that at least two of the associated antennas have different radiation phase patterns, wherein electrically tuning the phase shift between the radiation phase patterns of the associated antennas is on the basis of obtained feedback related to performed radio communication.

* * * * *